US008534889B2

(12) United States Patent
Fujiyama et al.

(10) Patent No.: US 8,534,889 B2
(45) Date of Patent: Sep. 17, 2013

(54) VEHICLE HEADLIGHT

(75) Inventors: Yoshihiro Fujiyama, Hadano (JP); Hideyasu Shoji, Tokyo (JP); Takashi Akutagawa, Kawasaki (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/428,827

(22) Filed: Mar. 23, 2012

(65) Prior Publication Data

US 2012/0243248 A1 Sep. 27, 2012

(30) Foreign Application Priority Data

Mar. 24, 2011 (JP) ................................ 2011-065661
Mar. 24, 2011 (JP) ................................ 2011-065665

(51) Int. Cl.
*B60Q 1/04* (2006.01)
*F21V 7/09* (2006.01)

(52) U.S. Cl.
USPC ............................ 362/539; 362/517; 362/346

(58) Field of Classification Search
USPC .......................................... 362/538, 539, 517
See application file for complete search history.

(56) References Cited

U.S. PATENT DOCUMENTS

| | | | | |
|---|---|---|---|---|
| 7,093,966 | B2 * | 8/2006 | Yamamura et al. | 362/539 |
| 7,186,009 | B2 * | 3/2007 | Yamamura et al. | 362/517 |
| 7,316,493 | B2 * | 1/2008 | Kinoshita | 362/539 |
| 7,325,954 | B2 * | 2/2008 | Futami | 362/538 |
| 2005/0063193 | A1 | 3/2005 | Yamamura et al. | |

FOREIGN PATENT DOCUMENTS

| | | | |
|---|---|---|---|
| JP | 2-47704 | U | 4/1990 |
| JP | 2005-100766 | A | 4/2005 |
| JP | 2008-91350 | A | 4/2008 |

* cited by examiner

*Primary Examiner* — Peggy A. Neils
(74) *Attorney, Agent, or Firm* — Kenealy Vaidya LLP

(57) ABSTRACT

A vehicle headlight can include a projector lens, a bulb disposed in a back direction from the projector lens, and having an axis in a right-left direction, a reflector disposed to cover the bulb from behind, a shade disposed between the projector lens and the bulb, a first additional reflection surface disposed in the front direction from the bulb, and reflecting light from the bulb toward a space lying ahead of the bulb end in a bulb-axis direction. A second additional reflection surface can be disposed in the space, and reflect light from the first additional reflection surface toward the projector lens. A top end portion of the shade can be bent in the back direction to form a low-beam cutoff line with back end edge. The first additional reflection surface can be disposed lower than the top end portion and in the front direction from the back end edge.

8 Claims, 7 Drawing Sheets

*FIG.7* CONVENTIONAL ART
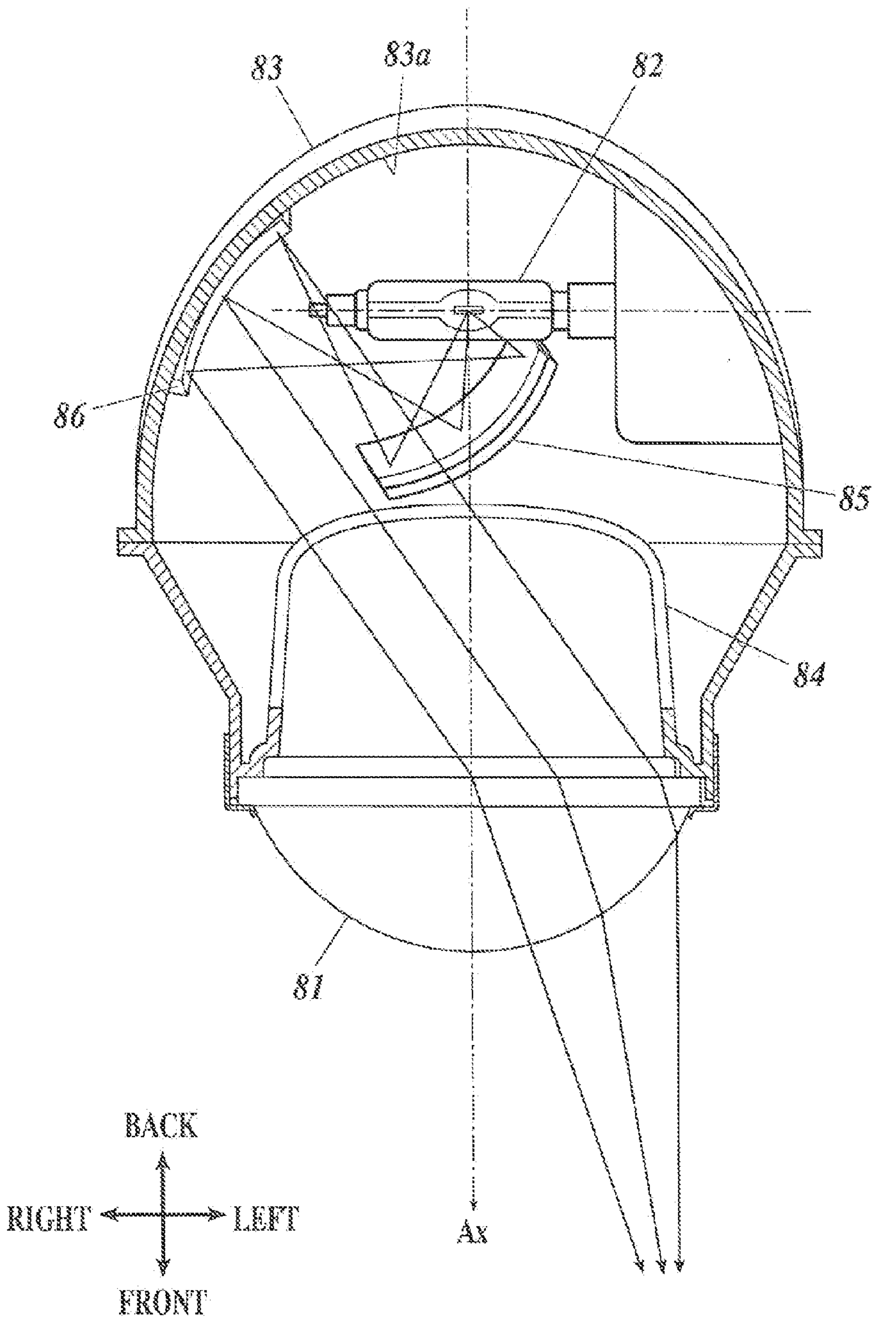

VEHICLE HEADLIGHT

This application claims the priority benefit under 35 U.S.C. §119 of Japanese Patent Application No. 2011-065661 and Japanese Patent Application No. 2011-065665 both filed on Mar. 24, 2011, which are hereby incorporated in their entireties by reference.

BACKGROUND

1. Field

The presently disclosed subject matter relates to a vehicle headlight.

2. Description of Related Art

So-called projector vehicle headlights, such as automotive headlights, have been known. The projector headlights reflect light emitted from a bulb with a reflector to illuminate an area in front of a vehicle through a projector lens.

In the projector headlights, a bulb is typically inserted into a reflector through the back part of the reflector and is fixed, with the bulb extending along the optical axis of a projector lens in the front-back direction. In recent years, however, in order to reduce the front-to-back length of headlights, different type of headlights have been proposed where a bulb is inserted into a reflector through the side part of the reflector in the direction perpendicular to the optical axis and is fixed thereat (See Japanese Utility Model Application Laid-Open No. 2-47704, for example).

By the way, the amount of light emitted from the bulb is the largest in the direction perpendicular to the bulb-axis direction in which the bulb extends, and the smallest in the bulb-axis direction. As a result, headlights with a bulb inserted through the side part of a reflector cannot deliver sufficient amount of light in the front direction because only a small amount of light is incident on the side part of the reflector surface that lies ahead of the end of the bulb in the bulb-axis direction. In particular, when providing a low-beam light distribution, it becomes more difficult to provide sufficient amount of light because a shade blocks a part of light from the reflector.

In view of the above characteristics and problems, a vehicle headlight disclosed in Japanese Patent Application Laid-Open No. 2005-100766, as illustrated in FIG. 7, has been proposed. In this vehicle headlight, a bulb 82 is inserted into a reflector 83 through the side part (left part) of the reflector 83 so that the bulb 82 is perpendicular to the optical axis Ax of a projector lens 81. In addition, a first additional reflector 85 and a second additional reflector 86 are added. The first additional reflector 85 is provided between the bulb 82 and a shade 84; and the second additional reflector 86 is provided in the side part of a reflection surface 83*a* of the reflector 83, which side part lies ahead of the end of the bulb 82 in the bulb-axis direction (that is, the side part is to the right of the end of the bulb 82). As indicated by arrows in FIG. 7, the first additional reflector 85 reflects direct light from the bulb 82 to the back direction, and the second additional reflector 86 in turn reflects the light from the first additional reflector 85 to the vehicle-front direction.

In this way, the vehicle headlight disclosed in Japanese Patent Application Laid-Open No. 2005-100766 utilizes the side part of the reflection surface 83*a*, on which only a small portion of light directly emitted from the bulb 82 is incident, by placing the second additional reflector 86 thereon. Further, the vehicle headlight makes efficient use of light, which would have been blocked by the shade 84, with the first additional reflector 85 and the second additional reflector 86.

Thus, the vehicle headlight can increase available luminous flux and can deliver sufficient amount of light in the front direction.

However, in the vehicle headlight disclosed in Japanese Patent Application Laid-Open No. 2005-100766, the first additional reflector 85 is simply disposed between the bulb 82 and the shade 84, which makes a space around the bulb 82 narrow. As a result, heat from the bulb 82 is not easily escaped, which causes a problem of the rise in temperature around the bulb 82.

SUMMARY

In order to address such characteristics, features and problems, the presently disclosed subject matter provides a projector vehicle headlight to provide a low-beam light distribution that can deliver sufficient amount of light in the front direction, and at the same time, that can suppress the rise in temperature around a bulb, even in the case of a structure where the bulb is inserted into a reflector through the side part thereof.

According to an aspect of the presently disclosed subject matter, there is provided a vehicle headlight to form a low beam in front of a vehicle, the vehicle headlight can include: a projector lens having an optical axis that extends in a front-back direction; a bulb disposed in a back direction from the projector lens, the bulb having a bulb axis that extends in a direction approximately perpendicular to the optical axis; a reflector disposed to cover the bulb from behind, the reflector having a main reflection surface that reflects light emitted from the bulb in a front direction, a shade disposed between the projector lens and the bulb, the shade blocking a part of light from the main reflection surface; a first additional reflection surface disposed in the front direction from the bulb, the first additional reflection surface reflecting the light emitted from the bulb toward a space that lies ahead of an end of the bulb in a bulb-axis direction; and a second additional reflection surface disposed in the space, the second additional reflection surface reflecting light from the first additional reflection surface in the front direction toward the projector lens, wherein a top end portion of the shade is bending in the back direction to form a cutoff line of the low beam with a back end edge of the top end portion; and the first additional reflection surface is disposed lower than the top end portion and in the front direction from the back end edge.

BRIEF DESCRIPTION OF THE DRAWINGS

The above and other characteristics, advantages and features of the presently disclosed subject matter will become more fully understood from the detailed description given hereinbelow and the appended drawings which are given by way of illustration only, and thus are not intended as a definition of the limits of the presently disclosed subject matter, and wherein:

FIG. 7 is a top sectional view of a conventional vehicle headlight.

DESCRIPTION OF EXEMPLARY EMBODIMENTS

First and second exemplary embodiments of the presently disclosed subject matter will be described below with reference to the accompanying drawings.

Figure 1:
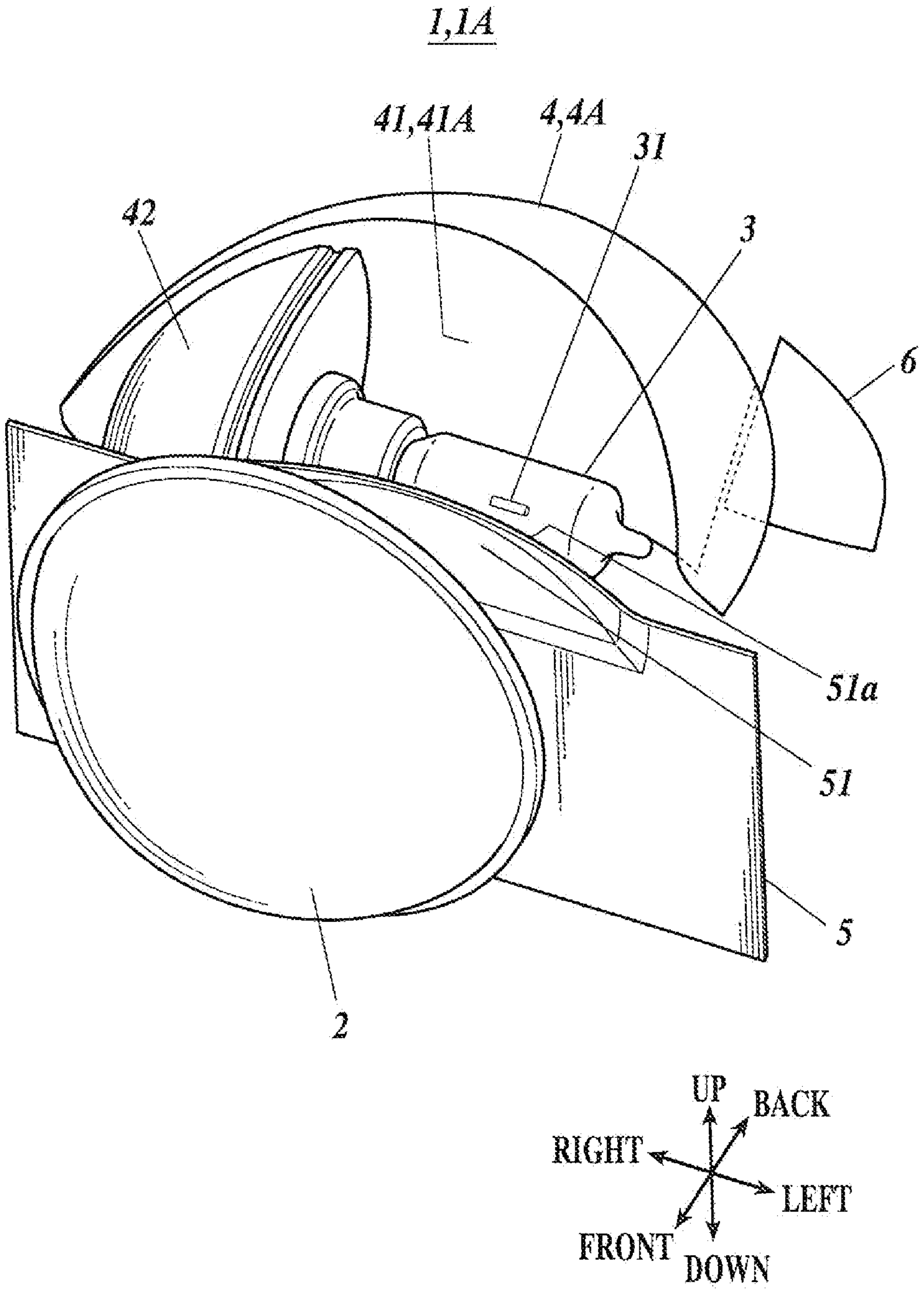
FIG. 1 is a perspective view of a vehicle headlight according to first and second embodiments of the presently disclosed subject matter.
Figure 2:
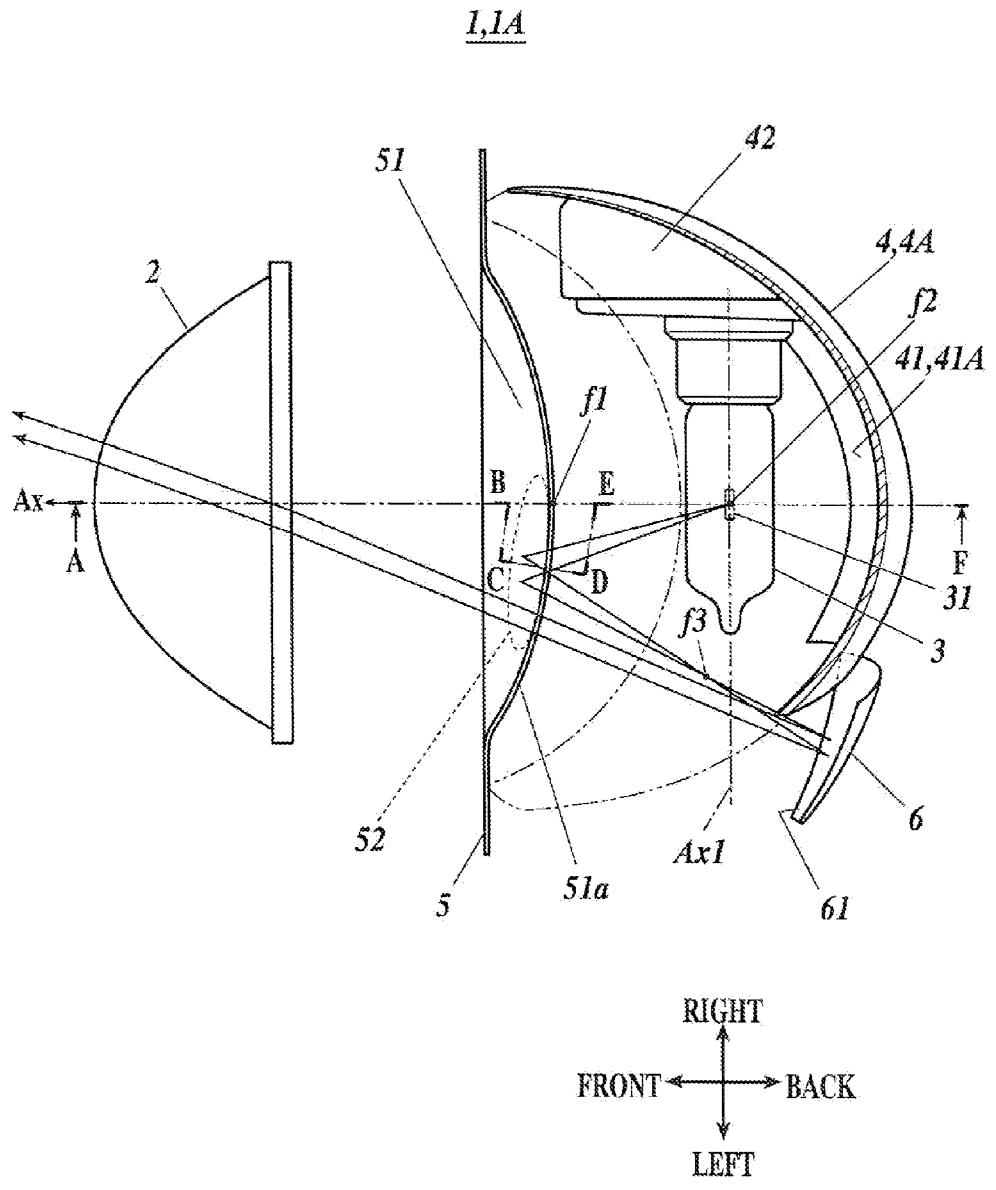
FIG. 2 is a top view of the vehicle headlight according to the first and second embodiments.
Figure 3:
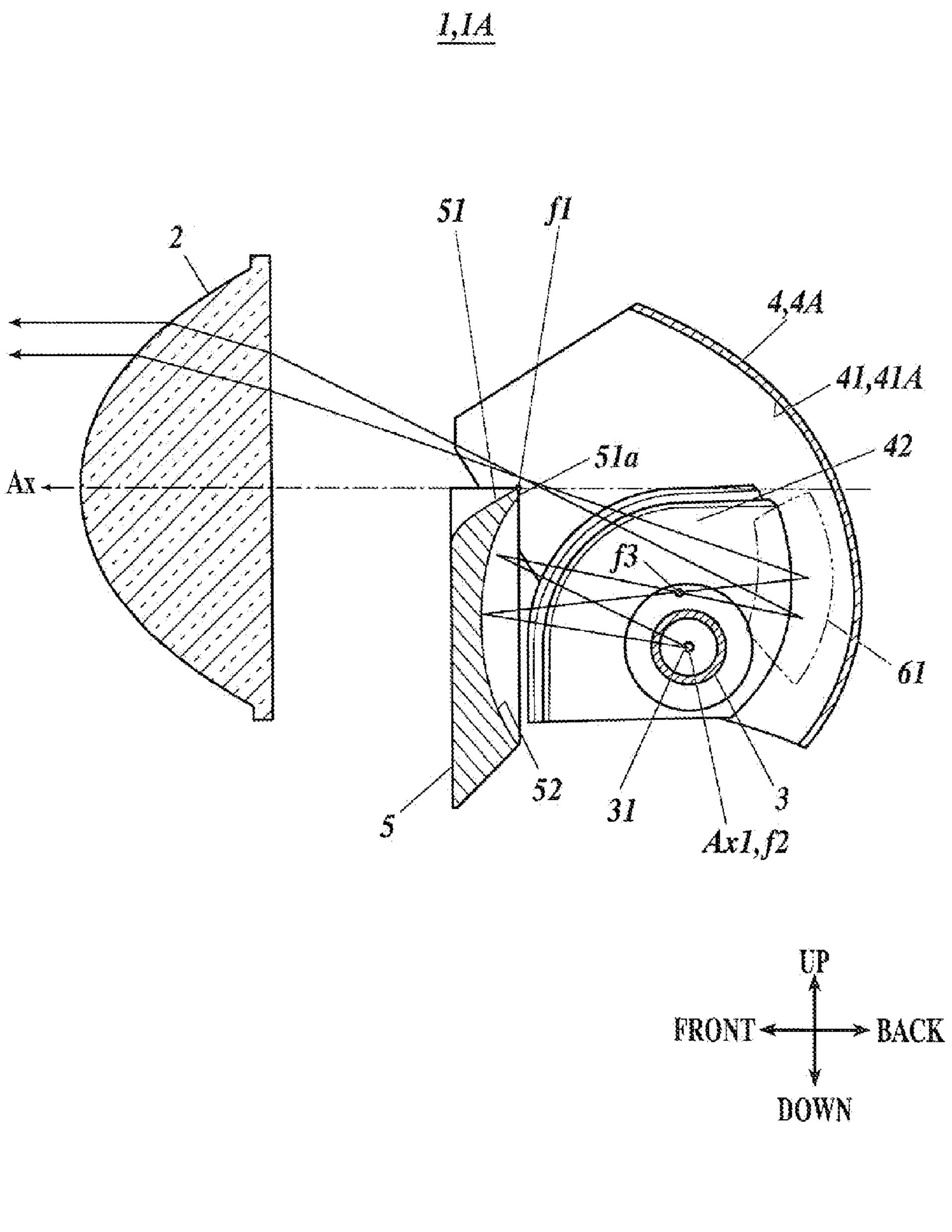
FIG. 3 is a sectional view along the line A B C D E F in FIG. 2.

First, the first exemplary embodiment of the presently disclosed subject matter is described below. FIG. 1 is a perspective view of a vehicle headlight 1 according to the embodiment. FIG. 2 is a top view of the vehicle headlight 1. FIG. 3 is a sectional view along the line A B C D E F in FIG. 2.

Further, in the following description, "front", "back", "right", "left", "up", and "down" are the directions as seen from a vehicle headlight 1, if no special explanatory note is given. The directions used here correspond to those in the drawings.

As shown in FIG. 1 to FIG. 3, the vehicle headlight 1 is a projector headlight to be mounted on a vehicle (not illustrated) to provide a low-beam light distribution in front of the vehicle. The vehicle headlight 1 includes a projector lens 2, a bulb 3, a reflector 4, a shade 5, and a sub-reflector 6.

The projector lens 2 is a plano-convex lens whose front surface is a convex surface. The projector lens 2 has an optical axis Ax extending in the front-back direction. The projector lens 2 inverts and projects an image, which is on the focal plane including a back focus f1 on the optical axis Ax, in the front direction.

The bulb 3 is a halogen lamp having a filament 31 and is disposed so that the bulb axis Ax1 extends approximately in the right-left direction. More specifically, the bulb 3 is disposed in the back direction from the back focus f1 of the projector lens 2 and below the optical axis Ax. The bulb 3 is inserted into the reflector 4 through the right part of the reflector 4 in the right-to-left direction so that the filament 31 is disposed just below the optical axis Ax. Further, the bulb 3 is fixed to a bulb support 42 (described later) provided in the reflector 4. The amount of light emitted in the direction perpendicular to the bulb axis Ax1 is larger than that emitted in the direction of the bulb axis Ax1.

The reflector 4 is in a bowl shape having an opening toward the front and is disposed to cover the bulb 3 from behind. A bulb support 42 that supports the base end portion of the bulb 3 is provided on the front surface of the reflector 4 at the lower right of the optical axis Ax. The reflector 4 has a cutout in a left-side part thereof. More specifically, the cutout is located ahead of the end of the bulb 3 in the direction of the bulb axis Ax1, into which the bulb 3 is inserted (hereinafter referred to as a bulb-axis-Ax1 direction). In other words, the cutout is formed in the reflector 4 at the lower left of the optical axis Ax.

The front surface of the reflector 4, except for the right part thereof where the bulb support 42 is provided, is a reflection surface 41 that has a shape based on an ellipsoid of revolution. The reflection surface 41 reflects light emitted from the bulb 3 toward the focal plane, which includes the back focus f1 of the projector lens 2.

The shade 5 is a shading plate standing so as to be perpendicular to the optical axis Ax and is provided between the projector lens 2 and the bulb 3, with the top edge of the shade 5 positioned approximately at the level of the optical axis Ax with respect to the up-down direction. A top end portion 51, which is in the center part of the shade 5 with respect to the right-left direction, is bending in the back direction. A back end edge 51*a* of the top end portion 51 is positioned near the back focus f1 of the projector lens 2. The back end edge 51*a* is curved such that a portion of the back end edge 51*a* is located anterior as the portion is away from the optical axis Ax in the right and left directions along the focal plane, which includes the back focus f1 of the projector lens 2. Thus, the shade 5 blocks a part of light reflected from the reflection surface 41 of the reflector 4, and forms a cutoff line at the top edge of a low beam as an inverted image of the back end edge 51*a*.

Figure 4:
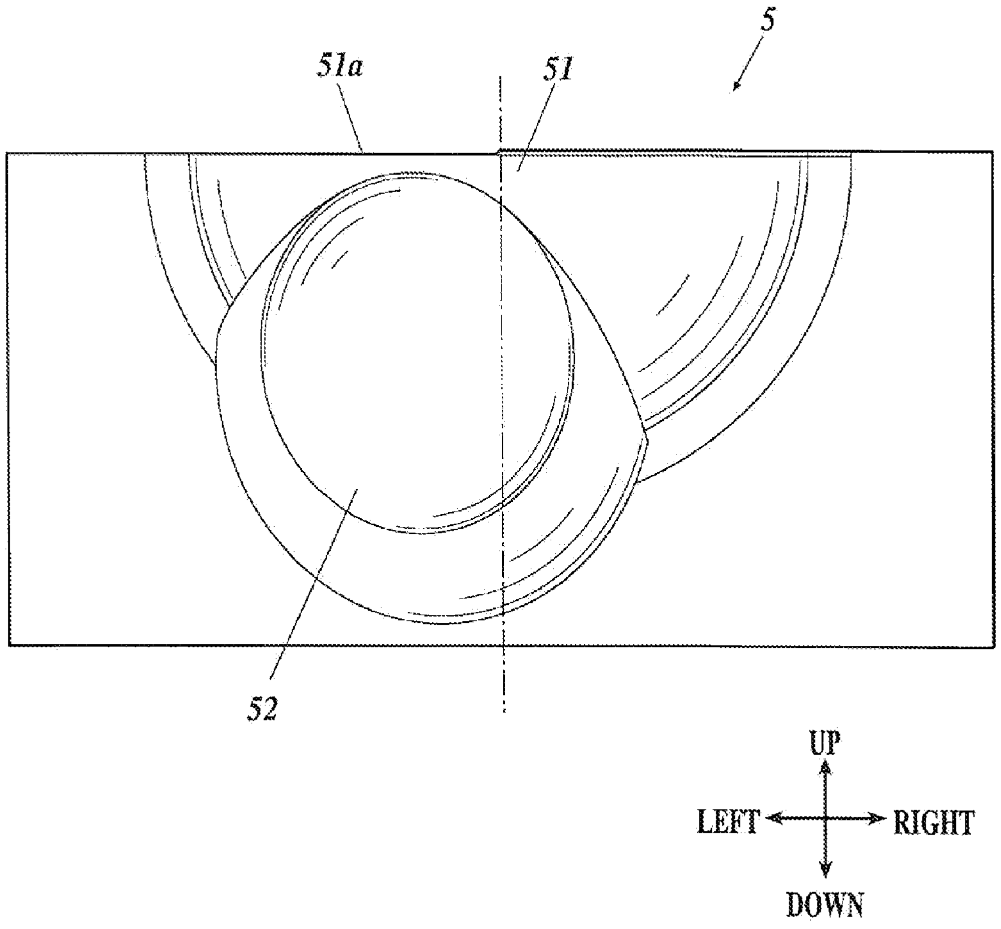
FIG. 4 is a back view of a shade of the first embodiment.

FIG. 4 is a back view of the shade 5.

On the back surface of the shade 5, a first additional reflection surface 52 is provided at a position a little to the left with respect to the right-left direction, as illustrated in FIG. 3 and FIG. 4. The first additional reflection surface 52 is in a shape of an ellipsoid of revolution that has a first focus f2 near the filament 31 and has a second focus f3 at a predetermined position between the shade 5 and the sub-reflector 6. The first additional reflection surface 52 reflects light emitted from the bulb 3 in the diagonally-left-back direction, i.e., toward a space that lies ahead of the left end of the bulb 3 in the bulb-axis-Ax1 direction. The first additional reflection surface 52 is disposed lower than the top end portion 51 of the shade 5 and is disposed in the front direction from a back end edge 51*a*. This allows the shade 5, which is approximately in a shape of flat plate, and the first additional reflection surface 52 to be integrally formed (i.e., formed in space-saving manner). As a result, the space between the bulb 3 and the shade 5 can be large.

The sub-reflector 6 is disposed in the left part of the reflector 4 and disposed in a space that lies ahead of the left end of the bulb 3 approximately in the bulb-axis-Ax1 direction, as illustrated in FIG. 1 to FIG. 3. The front surface of the sub-reflector 6 is a second additional reflection surface 61. The vertical cross section, which is perpendicular to the right-left direction, of the second additional reflection surface 61 has a shape of an ellipse whose first focus is at the second focus 13 of the first additional reflection surface 52 and whose second focus is near the back end edge 51*a* of the shade 5. The horizontal cross section, which is perpendicular to the up-down direction, of the second additional reflection surface 61, has a shape of a parabola whose focus is near the second focus 13 of the first additional reflection surface 52. Accordingly, the second additional reflection surface 61 reflects light from the first additional reflection surface 52 in the front direction toward the projector lens 2 such that the light is condensed near the back end edge 51*a* of the shade 5 with respect to the vertical direction, and such that the light is widely-spread to a certain degree with respect to the horizontal direction. The light reflected by the second additional reflection surface 61 in the front direction is delivered forward through the projector lens 2 and contributes to formation of a low-beam light distribution.

As described above, in the vehicle headlight 1, the light emitted from the bulb 3 toward the shade 5 is successively reflected by the first additional reflection surface 52 and the second additional reflection surface 61 in this order to be delivered in the front direction through the projector lens 2. Accordingly, a space, which lies ahead of the end of the bulb 3 in the bulb-axis direction and which receives only a small portion of light directly emitted from the bulb 3, is utilized as a second additional reflection surface 61. Further, the first additional reflection surface 52 and the second additional reflection surface 61 enable light that would have been blocked by the shade 5 to be efficiently utilized. Thus, available luminous flux is increased, which makes it possible to deliver sufficient amount of light in providing a low-beam light distribution. Therefore, the vehicle headlight 1 can illuminate things with sufficient amount of light even when the bulb 3 is inserted into the reflector 4 through the side part thereof such that the bulb axis Ax1 is approximately perpendicular to the optical axis Ax.

Further, the first additional reflection surface 52 provided on the back surface of the shade 5 is disposed below the top end portion 51, which is bending in the back direction, and at the same time, is disposed in the front direction from the back end edge 51*a* of the top end portion 51, which forms a cutoff line of low beam. Accordingly, the first additional reflection surface 52 and the shade 5 can be integrally formed unlike a conventional headlight where a first additional reflector, which corresponds to the first additional reflection surface 52, is simply disposed between a bulb and a shade. As a result, the space between the bulb 3 and the shade 5 is larger than that of the conventional headlight, which facilitates release of heat from the bulb 3 and suppresses the rise in temperature around the bulb 3.

Further, since the first additional reflection surface 52 is provided on the back surface of the shade 5, the number of parts is reduced compared to a conventional headlight where the first additional reflector, which corresponds to the first additional reflection surface 52, is formed separately from a shade. As a result, positioning process for the first additional reflection surface 52 and that for the shade 5 can be integrated, resulting in simplifying the assembly processes.

Figure 5:
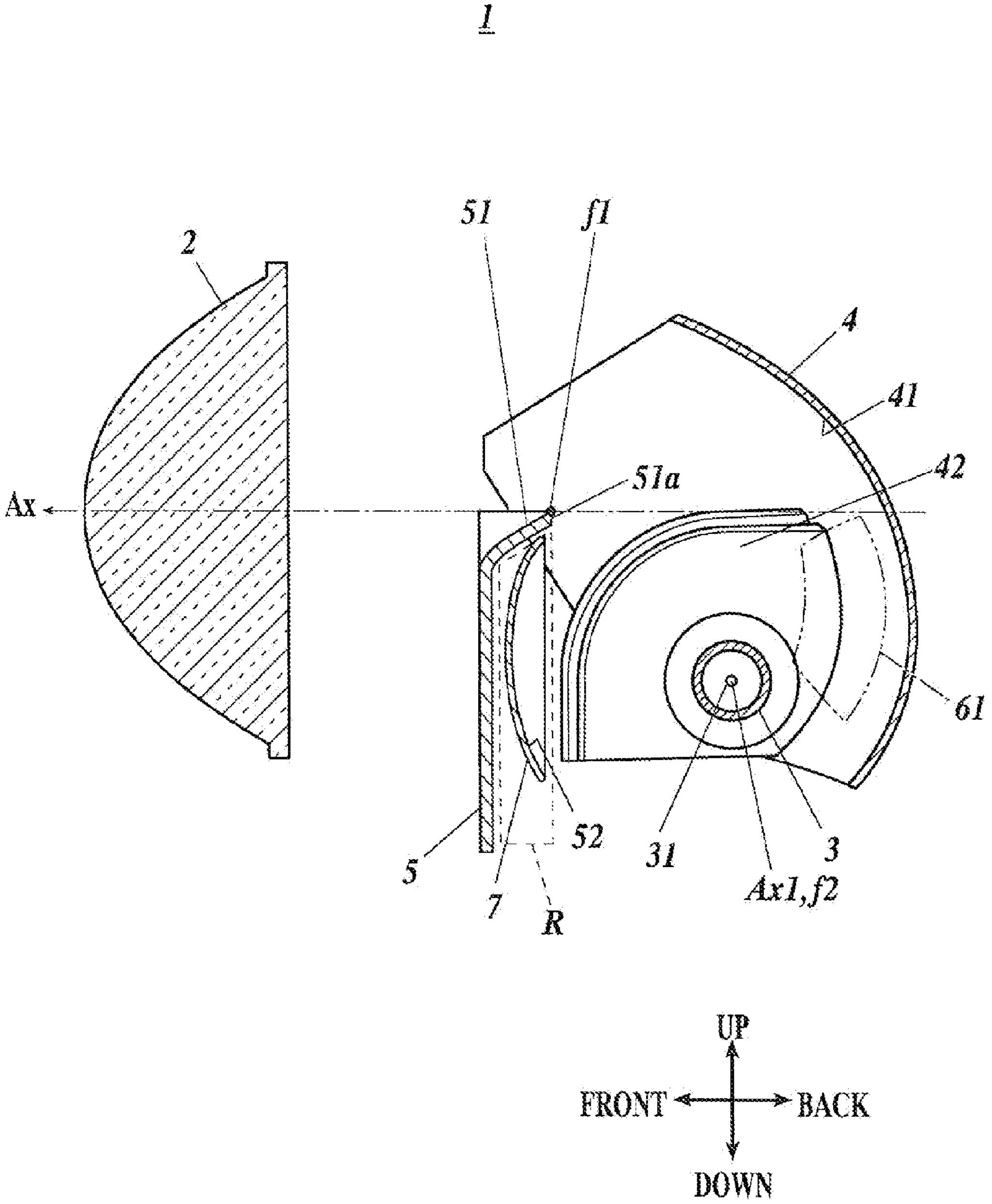
FIG. 5 is a sectional view illustrating another example of a vehicle headlight of the first embodiment.

In the above-described embodiment, the first additional reflection surface 52 is provided on the back surface of the shade 5, with the first additional reflection surface 52 and the shade 5 being integrally formed. Alternatively, the first additional reflection surface 52 and the shade 5 may be separate from each other. More specifically, a second sub-reflector 7 having the first additional reflection surface 52 may be provided separately from the shade 5, as illustrated in FIG. 5. In this case, the first additional reflection surface 52 (second sub-reflector 7) is disposed in the front direction from the bulb 3 and below the top end portion 51 of the shade 5, and at the same time, disposed within a predetermined space R in the front direction from the back end edge 51*a*. However, the first additional reflection surface 52 (second sub-reflector 7) can be disposed as close as possible to the shade 5 in order to secure a large space around the bulb 3.

Next, a second exemplary embodiment of the presently disclosed subject matter is described below.

FIG. 1 to FIG. 3 are common to both the first and second embodiments. Since the structure of a vehicle headlight 1A of the second embodiment is basically the same as that of the vehicle headlight 1 of the first embodiment, the same components of the vehicle headlight 1A as those of the vehicle headlight 1 are denoted with the same reference numerals and alphabets. In the following explanation, only a reflector 4A, which is a portion different from that for the first embodiment, is explained with reference to FIG. 6.

Figure 6:
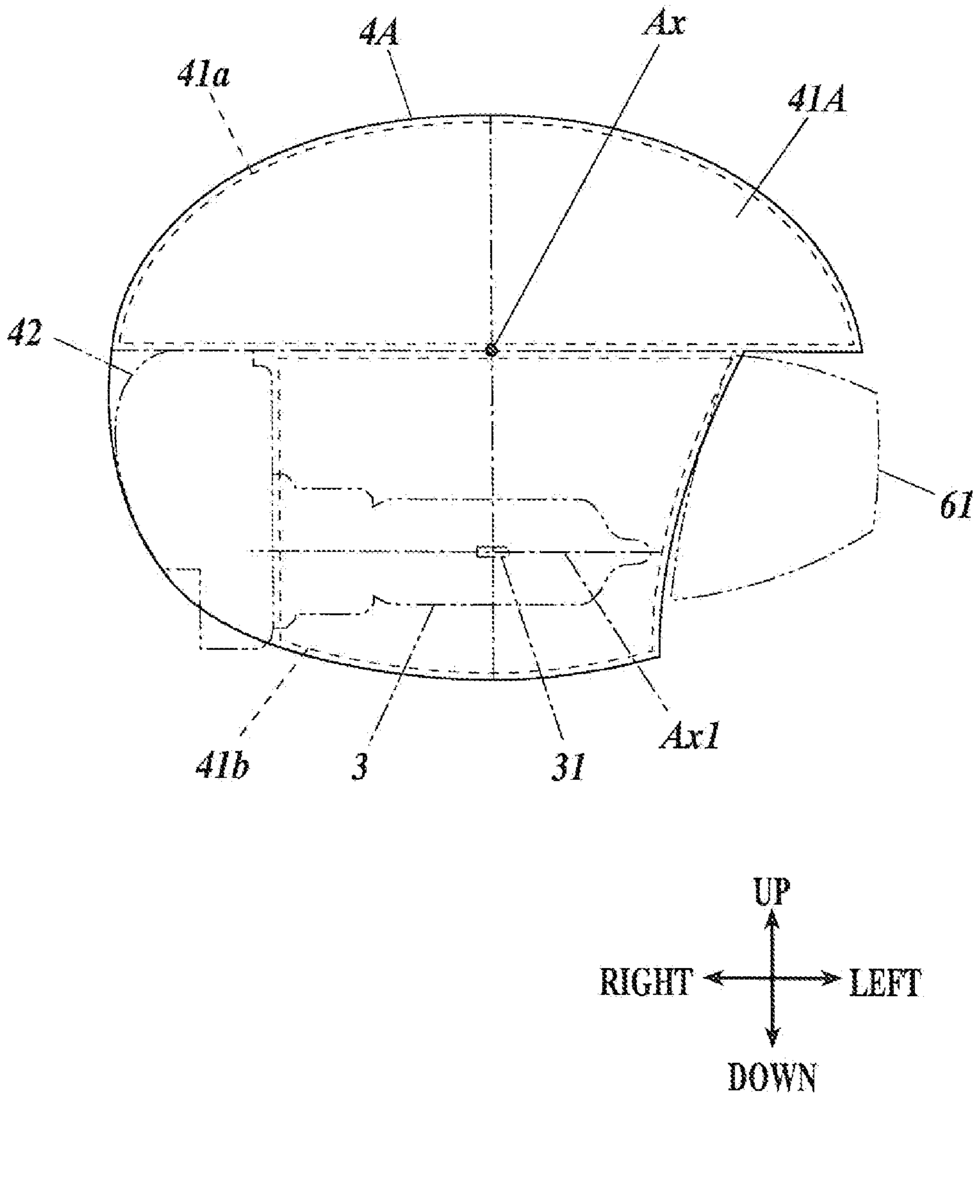
FIG. 6 is a front view of a reflector of the second embodiment.

FIG. 6 is a front view of a reflector 4A of the embodiment.

As shown in FIG. 6, the front surface of the reflector 4A, except for the right part thereof where the bulb support 42 is provided, is a reflection surface 41A that has a shape based on an ellipsoid of revolution. The reflection surface 41A reflects light emitted from the bulb 3 toward the focal plane, which includes the back focus f1 of the projector lens 2. The reflection surface 41A is formed as a continuous surface without a step over the whole surface. More specifically, an upper reflection surface 41*a*, which is above the optical axis Ax, of the reflection surface 41A and a lower reflection surface 41*b*, which is below the optical axis Ax, of the reflection surface 41A are each formed as a continuous surface without a step and are connected to each other smoothly. As a result, the horizontal spread angle of light reflected by the upper reflection surface 41*a* and the horizontal spread angle of light reflected by the lower reflection surface 41*b* are the same.

As described above, since the reflection surface 41A of the reflector 4A of the vehicle headlight 1A is formed as a continuous surface without a step, a blind spot (i.e., an area which the light from the bulb 3 does not reach) does not exist in the reflection surface 41A. In addition, it is not necessary to form a step-like shape in a die for molding a reflection surface 41A. As a result, it is possible to effectively utilize the entire reflection surface 41A of the reflector 4A and it becomes easier to manufacture molding dies for a reflector 4A.

Further, the reflection surface 41A reflects light emitted from the bulb 3 such that the horizontal spread angle of light reflected by the upper reflection surface 41*a* and the horizontal spread angle of light reflected by the lower reflection surface 41*b* are the same. Accordingly, both the upper reflection surface 41*a* and the lower reflection surface 41*b* contribute to the formation of a condensed-light area in a light distribution pattern, which cannot be achieved by the conventional art where the lower reflection surface forms a condensed-light area in a light distribution pattern and the upper reflection surface forms a widely-spread-light area of a light distribution pattern. As a result, the vehicle headlight 1A can form a condensed-light area with high luminosity in the light distribution even when a halogen lamp, which provides relatively small amount of light, is employed as the bulb 3.

Embodiments to which the presently disclosed subject matter is applicable are not limited to the first and second embodiments described above. The embodiments may be modified in a variety of ways without deviating from the concept of the presently disclosed subject matter.

According to an aspect of the exemplary embodiments of the presently disclosed subject matter, there is provided a vehicle headlight to form a low beam in front of a vehicle, the vehicle headlight can include: a projector lens having an optical axis that extends in a front-back direction; a bulb disposed in a back direction from the projector lens, the bulb having a bulb axis that extends in a direction approximately perpendicular to the optical axis; a reflector disposed to cover the bulb from behind, the reflector having a main reflection surface that reflects light emitted from the bulb in a front direction, a shade disposed between the projector lens and the bulb, the shade blocking a part of light from the main reflection surface; a first additional reflection surface disposed in the front direction from the bulb, the first additional reflection surface reflecting the light emitted from the bulb toward a space that lies ahead of an end of the bulb in a bulb-axis direction; and a second additional reflection surface disposed in the space, the second additional reflection surface reflecting light from the first additional reflection surface in the front direction toward the projector lens, wherein a top end portion of the shade is bending in the back direction to form a cutoff line of the low beam with a back end edge of the top end portion; and the first additional reflection surface is disposed lower than the top end portion and in the front direction from the back end edge.

The first additional reflection surface can be disposed on a back surface of the shade.

The bulb can be disposed lower than the top end portion.

A vertical cross section, which is perpendicular to a right-left direction, of the second additional reflection surface can have a shape of an ellipse whose first focus is at a focus of the first additional reflection surface and whose second focus is near the back end edge; and a horizontal cross section, which is perpendicular to an up-down direction, of the second additional reflection surface can have a shape of a parabola whose focus is near the focus of the first additional reflection surface.

The main reflection surface can be a continuous surface without a step.

The bulb can be a halogen lamp.

A horizontal spread angle of light reflected by an upper part of the main reflection surface and a horizontal spread angle of light reflected by a lower part of the main reflection surface can be the same, the upper part being above the optical axis and the lower part being below the optical axis.

The entire disclosure of Japanese Patent Application No. 2011-065665 filed on Mar. 24, 2011; and Japanese Patent Application No. 2011-065661 filed on Mar. 24, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A vehicle headlight to form a low beam in front of a vehicle, the vehicle headlight comprising:

a projector lens having an optical axis that extends in a front-back direction;

a bulb disposed in a back direction from the projector lens, the bulb having a bulb axis that extends in a direction approximately perpendicular to the optical axis;

a reflector disposed to cover the bulb from behind, the reflector having a main reflection surface configured to reflects light emitted from the bulb in a front direction during operation of the bulb, a shade disposed between the projector lens and the bulb, the shade configured to block a part of light received from the main reflection surface during operation of the bulb;

a first additional reflection surface disposed in the front direction from the bulb, the first additional reflection surface configured to reflect light emitted from the bulb toward a space that lies ahead of an end of the bulb in a bulb-axis direction during operation of the bulb; and a second additional reflection surface disposed in the space, the second additional reflection surface configured to reflect light received from the first additional reflection surface in the front direction toward the projector lens during operation of the bulb, wherein a top end portion of the shade is bent in the back direction to form a cutoff line for the low beam with a back end edge of the top end portion; and the first additional reflection surface is disposed lower than the top end portion and further in the front direction as compared to the back end edge.

2. The vehicle headlight according to claim 1, wherein the first additional reflection surface is disposed on a back surface of the shade.

3. The vehicle headlight according to claim 1, wherein the bulb is disposed lower than the top end portion.

4. The vehicle headlight according to claim 2, wherein a vertical cross section, which is perpendicular to a right-left direction, of the second additional reflection surface has a shape of an ellipse whose first focus is at a focus of the first additional reflection surface and whose second focus is near the back end edge; and a horizontal cross section, which is perpendicular to an up-down direction, of the second additional reflection surface has a shape of a parabola whose focus is near the focus of the first additional reflection surface.

5. The vehicle headlight according to claim 1, wherein the main reflection surface is a continuous surface without a step.

6. The vehicle headlight according to claim 5, wherein the bulb is a halogen lamp.

7. The vehicle headlight according to claim 5, wherein a horizontal spread angle of light reflected by an upper part of the main reflection surface and a horizontal spread angle of light reflected by a lower part of the main reflection surface are the same, the upper part being above the optical axis and the lower part being below the optical axis.

8. The vehicle headlight according to claim 1, further comprising:

a sub-reflector completely spaced from and located on one side of the optical axis and adjacent the reflector, the sub-reflector configured to reflect light received from the first additional reflection surface towards the projection lens during operation of the bulb, and the sub-reflector not being a continuous surface with the main reflection surface.

* * * * *